Nov. 25, 1924.  1,516,841
A. C. BUTTFIELD
MACHINE FOR MAKING ARTICLES OF PLASTIC COMPOUNDS OF DIFFERENT COLORS
Filed April 14, 1922  2 Sheets-Sheet 1
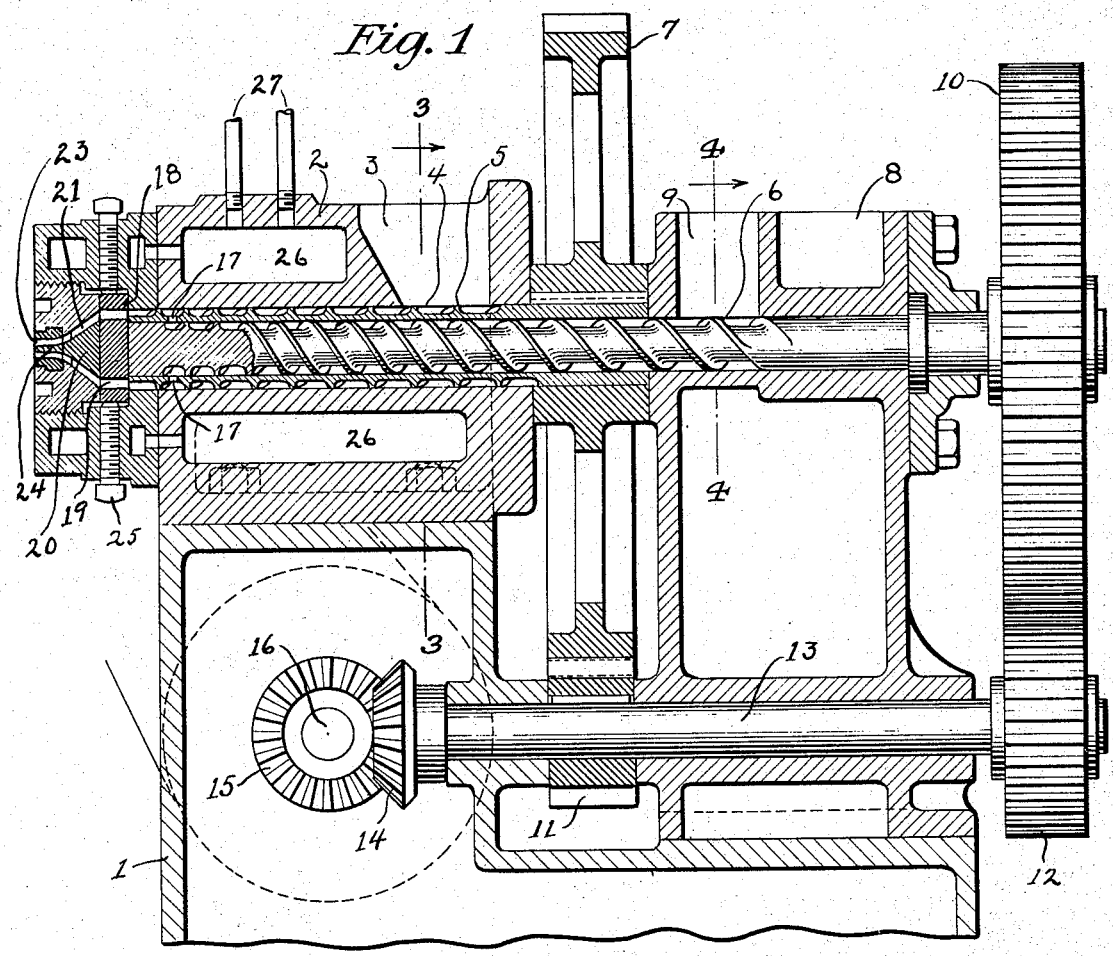
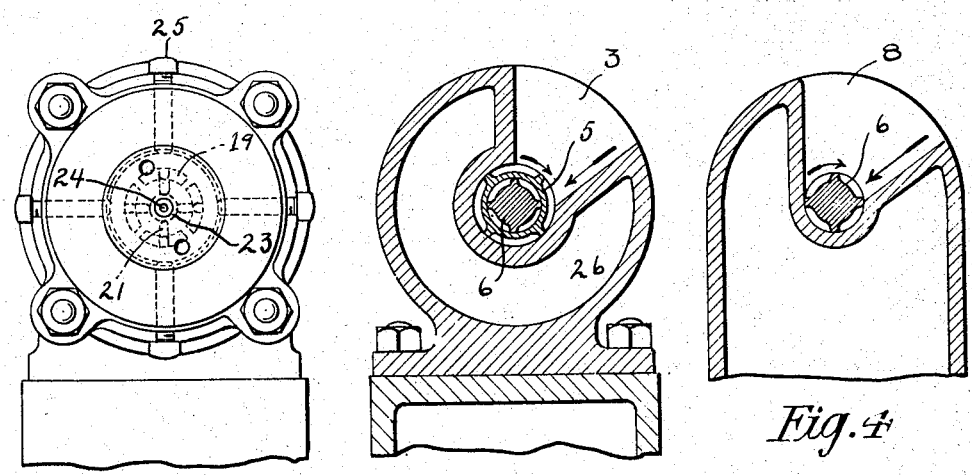
Fig.2  Fig.3  Fig.4
Inventor
Alfred C. Buttfield
By his Attorney
Leo J. Matty Nov. 25, 1924.
A. C. BUTTFIELD
1,516,841
MACHINE FOR MAKING ARTICLES OF PLASTIC COMPOUNDS OF DIFFERENT COLORS
Filed April 14, 1922   2 Sheets-Sheet 2
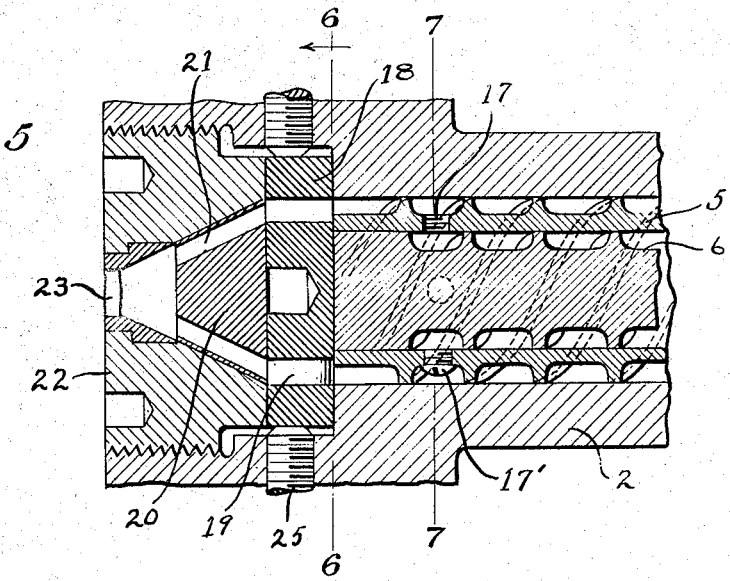
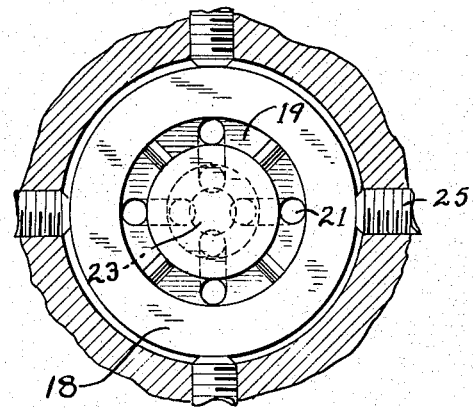
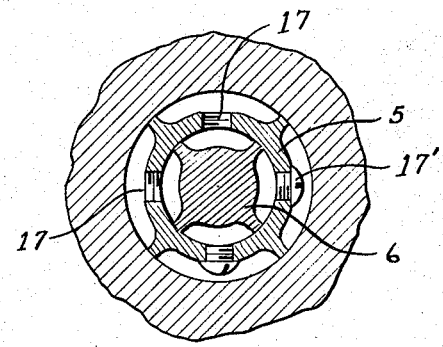
Inventor
Alfred C. Buttfield
By his Attorney
Leo J. Matty Patented Nov. 25, 1924.

1,516,841

UNITED STATES PATENT OFFICE.

ALFRED C. BUTTFIELD, OF BUTLER, NEW JERSEY, ASSIGNOR TO AMERICAN HARD RUBBER CO., OF NEW YORK, N. Y., A CORPORATION OF NEW YORK.

MACHINE FOR MAKING ARTICLES OF PLASTIC COMPOUNDS OF DIFFERENT COLORS.

Application filed April 14, 1922. Serial No. 552,786.

*To all whom it may concern:*

Be it known that I, ALFRED C. BUTTFIELD, residing at Butler, in the county of Morris and State of New Jersey, have invented new and useful Improvements in Machines for Making Articles of Plastic Compounds of Different Colors, of which the following is a full, clear, and exact description, such as will enable others skilled in the art to which it appertains to make or use the same.

This invention relates to a machine and to a process for making rods, tubes, or the like, of plastic compounds of two or more colors, and the objects of the invention are to improve the appearance of said rods or tubes by giving them the grained appearance of wood.

To the accomplishment of the above objects and to such others as may hereinafter appear, the invention comprises a machine and a process for incompletely mixing or streaking a plurality of plastic compounds of contrasting colors each with the other, separating the same by forcing the incomplete or streaked mixture through a plurality of passageways, and subsequently joining the various mixtures just previous to the time the same is forced through a common orifice, which thereby acts to give to the finished article a very pleasing appearance resembling the grained appearance of wood.

While the invention is to be described with particular reference to the use of plastic hard rubber compounds of different colors and to a machine for forming said compounds, the same is not to be considered as limited thereto, as the process, as well as the machine, is adapted for use with other plastic compounds.

In the drawings:—

Figure 1 is a longitudinal sectional view of a machine made in accordance with the invention.

Figure 2 is an end view of the head block.

Figure 3 is a transverse sectional view on the line 3—3 of Fig. 1.

Figure 4 is a transverse sectional view on the line 4—4 of Fig. 1.

Figure 5 is an enlarged detail view of the discharge end of the outer and inner feed screws, together with the head block arranged to make rods, in longitudinal section Figure 6 is a sectional view on the line 6—6 of Fig. 5.

Figure 7 is a sectional view on the line 7—7 of Fig. 5.

Figure 8 is a view of the finished article showing the grained appearance.

Referring to the drawings, 1 designates the frame of the machine upon which is mounted a head block 2 provided with a feed opening 3 which communicates with a centrally located screw chamber 4 in which is rotatably mounted an outer feed screw 5 and an inner feed screw 6.

The body portion of the feed screw 5 extends at one end beyond the side of the head block 2 and has keyed thereto a large gear 7 for turning the same. The central portion of the feed screw 5 is bored throughout its length and has mounted therein the feed screw 6 which extends at one end beyond the large gear 7 where it is rotatably mounted in a tail block 8 having a feed opening 9. The body portion of the feed screw 6 extends beyond the side of the tail block 8 and has keyed thereto a large gear 10 for turning the same.

The large gears 7 and 10 are respectively arranged to engage pinions 11 and 12 secured to a shaft 13 mounted in the frame 1. The shaft 13 is provided at one end with a bevel gear 14 which meshes with a bevel gear 15 secured to one end of a driving shaft 16 also mounted in the frame. By referring to the drawings it will be seen that the pinion 11 is considerably smaller than the pinion 12, it being desirable to rotate the inner feed screw 6 approximately twice as fast as the outer feed screw 5, so that the relative feeding movement of the inner and outer feed screws will be approximately the same.

The thread on the discharge end of the inner feed screw 6 does not extend to the end of the feed screw which is arranged to completely fill the hollow end of the outer feed screw. Suitable discharge openings 17 are provided in the outer feed screw, between the outer feed screw thread, adjacent the end of the inner feed screw thread, so that the material fed by the inner feed screw will be fed or squeezed into the material fed by the outer feed screw, near the ends of its feeding movement. By referring to Fig. 7 it will be seen that four discharge openings 17 are provided, and that two of these openings are closed by means of small screws 17' by means of which the discharge from the inner feed screw can be regulated as desired.

Suitably secured to the head block 2 adjacent the discharge end of the outer feed screw 5 is a guide block 18 provided with annular openings 19 adjacent the discharge end of the outer feed screw 5. The central portion of the guide block 18 is adapted to removably hold a feed block 20 which is provided with a plurality of spaced passageways 21 through which the material fed by the inner and outer feed screws is fed or squeezed to a discharge block 22 having a contracted orifice 23 where the material joins as it is being forced outward to form either a rod or a tube depending upon the shape of the feed block 20.

The feed block 20 shown in Fig. 1 is provided with an extension 24 which extends beyond the end of the passageways 21 into the centre of the orifice 23 so that the material as it is forced out will form a tube. The feed block 20 shown in Fig. 5 is not provided with an extension, hence does not extend beyond the end of the passageways so that the material as it is forced out of the orifice 23 will form a rod.

The guide block 18 to which the feed block 20 is secured, is adjustably mounted, in the present instance, in the head block 2 by means of suitable set screws 25 which permits of the same being adjusted to regulate within small limits the feed block 20.

The head block 2 is preferably jacketed, as shown at 26, to permit of steam or the like being admitted through the medium of the pipes 27 to regulate the temperature of the screw chamber 4 which acts to facilitate the plastic compounds being fed by the inner and outer feed screws.

In accordance with the present invention a black hard rubber compound may, for example, be fed in a plastic condition into the feed opening 3, and a red hard rubber compound may, for example, being of a contrasting color, be fed in a plastic condition into the feed opening 8. The inner and outer feed screws both act to force its respective plastic compound toward the discharge end of the feed screws, the plastic compound carried by the inner feed screw being forced out through the discharge openings 17 which acts to streak or incompletely mix the black hard rubber compound with red hard rubber compound. In the further operation of the machine the black hard rubber compound streaked with red hard rubber compound is forced, in the present instance, into the annular recesses 19 from which the streaked compound is forced through the passageways 22 into the contracted orifice 23 to form the finished article. The black hard rubber compound streaked with red hard rubber compound forms straight lines of various lengths and of contrasting colors, giving a grained appearance to the finished article which extends all the way through the same, the beauty of the article being enhanced by cutting, to further expose the grained effect.

From the above description it will be obvious that the process may be varied to include another colored plastic compound by boring the central portion of the feed screw 6 throughout its length and mounting therein another feed screw feeding into suitable discharge openings in the end of the feed screw 6.

From the above it will be seen that means are provided for incompletely mixing or streaking plastic compounds of different colors one with the other, and dividing said plastic compounds into separate passageways through which they are forced to a contracted orifice to produce the finished article with a grained appearance.

While the invention has been described with particular reference to details, the same is not to be considered as limited thereto, as many changes can be made and still fall within the scope of the invention set forth in the following claims.

What I claim is:—

1. A machine for graining plastic compounds which comprises means for separately and continuously feeding a plurality of plastic compounds of different colors, means for incompletely mixing or streaking said plastic compounds together one with the other, a plurality of converging passageways, means for forcing said incompletely mixed plastic compounds through said passageways, an orifice and means for forcing said plastic compounds from said passageway through said orifice to produce a grained effect in said compound.

2. A machine for graining plastic compounds which comprises concentric means for incompletely mixing or streaking a plurality of plastic compounds of different colors, a plurality of independent converging passageways, means for forcing said incompletely mixed plastic compounds through said passageways, a discharge block having an orifice, and means for forcing said plastic compounds from said passageways through said discharge block and said orifice to produce a grained effect in said compound.

3. A machine for graining plastic compounds which comprises feed screw means for separately feeding a plurality of plastic compounds of different colors, means for incompletely mixing or streaking the plastic compounds together, a plurality of independent converging passageways, means for forcing said incompletely mixed plastic compounds through said passageways, a discharge block having an orifice, and means for forcing said plastic compounds from said passageways through said discharge block and said orifice to produce a grained effect in said compound.

4. A machine for graining plastic compounds which comprises a plurality of feed screws, each feed screw being arranged to feed a plastic compound of a different color, means for incompletely mixing or streaking the plastic compounds together, a plurality of independent converging passageways, means for forcing said incompletely mixed plastic compounds through said passageways, a discharge block having an orifice, and means for forcing said plastic compounds from said passageways through said discharge block and said orifice to produce a grained effect in said compound.

5. A machine for graining plastic compounds which comprises a plurality of feed screws, one within the other, each feed screw being arranged to feed a plastic compound of a different color, means for incompletely mixing or streaking the plastic compounds together, means for separating said incompletely mixed or streaked compound into a plurality of parts, and means for forcing said parts together to produce a grained effect in said compound.

6. A machine for graining plastic compounds which comprises a plurality of feed screws, each feed screw being arranged to feed a plastic compound of a different color, means for feeding the plastic compound from one feed screw to the other to incompletely mix or streak the plastic compounds together, means for separating said incompletely mixed or streaked compound into a plurality of parts, and means for forcing said parts together to produce a grained effect in said compound.

7. A machine for graining plastic compounds which comprises a plurality of feed screws, each feed screw being arranged to feed a plastic compound of a different color, means for feeding the plastic compound from one feed screw to the other near the end of its feeding movement to incompletely mix or streak the plastic compounds together, means for separating said incompletely mixed or streaked compound into a plurality of parts, and means for forcing said parts together to produce a grained effect in said compound.

8. A machine for graining plastic compounds which comprises a plurality of feed screws, each feed screw being arranged to feed a plastic compound of a different color, means for feeding the plastic compound from one feed screw to the other near the end of its feeding movement to incompletely mix or streak the plastic compounds together, means for regulating the feeding of the plastic compound from one feed screw to the other, means for separating said incompletely mixed or streaked compound into a plurality of parts, and means for forcing said parts together to produce a grained effect in said compound.

In testimony whereof I have signed this specification in the presence of two subscribing witnesses.

ALFRED C. BUTTFIELD.

Witnesses:
D. E. JONES,
K. J. DURANT.